United States Patent
Itoya et al.

(10) Patent No.: US 7,108,648 B2
(45) Date of Patent: *Sep. 19, 2006

(54) BUNDLED SHEETS PROCESSING APPARATUS

(75) Inventors: Masakazu Itoya, Kanagawa-ken (JP); Hiroyuki Kamiyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/122,112

(22) Filed: May 5, 2005

(65) Prior Publication Data

US 2005/0202947 A1    Sep. 15, 2005

Related U.S. Application Data

(62) Division of application No. 10/853,248, filed on May 26, 2004, now Pat. No. 6,905,449.

(30) Foreign Application Priority Data

Jun. 12, 2003  (JP) ............................. 2003-168125
May 11, 2004  (JP) ............................. 2004-141183

(51) Int. Cl.
    *B31B 1/54*    (2006.01)

(52) U.S. Cl. .................. 493/10; 493/3; 493/8; 493/29; 270/58.02; 270/58.09; 270/58.17; 271/3; 271/17; 271/234; 414/788.5; 414/789

(58) Field of Classification Search .............. 493/3, 493/8, 10, 29; 270/58.02, 58.09, 58.17; 271/3.17, 271/234, 236, 241, 245; 414/788.3, 788.5, 414/789
See application file for complete search history.

(56) References Cited

U.S. PATENT DOCUMENTS

| | | | |
|---|---|---|---|
| 3,566,757 A | | 3/1971 | Fujishiro |
| 3,568,578 A | | 3/1971 | Fujishiro |
| 4,360,196 A | | 11/1982 | Weisbach |
| 4,514,128 A | * | 4/1985 | Hedrick .................. 414/790.5 |
| 4,657,465 A | * | 4/1987 | Aoki ....................... 414/788.3 |
| 5,228,679 A | | 7/1993 | Borostyan |
| 5,842,827 A | * | 12/1998 | Kwasniewski et al. ..... 414/802 |
| 6,073,776 A | | 6/2000 | Seymour et al. |
| 6,095,518 A | | 8/2000 | Allmendinger et al. |
| 6,168,154 B1 | | 1/2001 | Asahara et al. |
| 6,190,116 B1 | | 2/2001 | Asada |
| 6,302,606 B1 | * | 10/2001 | Hayakawa et al. ......... 400/625 |
| 6,474,640 B1 | | 11/2002 | Bunch, III |

FOREIGN PATENT DOCUMENTS

JP    8-192819    7/1996

OTHER PUBLICATIONS

European Search Report for European Patent Application No. EP 04013631, dated Sep. 15, 2004.

* cited by examiner

*Primary Examiner*—Rinaldi I. Rada
*Assistant Examiner*—Hemant M. Desai
(74) *Attorney, Agent, or Firm*—Pillsbury Winthrop Shaw Pittman LLP

(57) ABSTRACT

A bundled sheet processing apparatus has a chute unit tilting between the first and second positions. A downstream side in the chute unit conveying direction, there is provided a stopper that has the contact surface narrower than the thickness of a bundle and stops the bundle by contacting the end of the bundle in the conveying direction with the contact surface. At this time, sheets protruding beyond the contact surface are detected by a detector.

10 Claims, 9 Drawing Sheets

US 7,108,648 B2

BUNDLED SHEETS PROCESSING APPARATUS

This application is a divisional of application Ser. No. 10/853,248 filed on May 26, 2004, now U.S. Pat. No. 6,905,449, issued on Jun. 14, 2005 and for which priority is claimed under 35 U.S.C. § 121. This application relies for priority on Japanese Patent Application No. 2003-168 125, filed in Japan on Jun. 12, 2003, and Japanese Patent Application No. 2004-141183, filed in Japan on May 11, 2004 under 35 U.S.C. § 119. The entire contents of all three applications are hereby incorporated by reference in their entireties.

BACKGROUND OF THE INVENTION

1. Field of the Invention

This invention relates to a bundled sheet processing apparatus that detects the state of a bundle of specific number of sheets banded and processes the bundle based on the detected result and a bundled sheets processing method.

2. Description of the Related Art

As a sheet processing apparatus, an apparatus that stacks and bands specific number of sheets is disclosed so far in Japanese Patent Publication No. 8-292819. This apparatus is characterized in that it detects any sheets protruding from stacked sheets immediately before banding them and bands stacked sheets in the state without protrusion. Thus, banded sheets without protrusion can be provided.

However, a conventional apparatus described above was not to detect the state of a bundle after banded and therefore, for example, when a banding strap became loose while the banded sheets are being conveyed, there is a worry that the banded state a bundle may become worse. When the banded posture of a bundle becomes loose, a jamming may be caused and in the worst case, sheets may come out from the bundle.

SUMMARY OF THE INVENTION

An object of this invention is to provide a bundled sheets processing apparatus that is capable of detecting the banded state of a bundle of banded sheets surely and a bundled sheets processing method.

According to this invention, there is provided a bundled sheets processing apparatus comprising: a conveying unit to convey a bundled sheets banded with a strap in the direction substantially orthogonal to the stacking direction of sheets; a stopper provided on a bundle conveying path of the conveying unit to stop the conveyed bundled sheets by striking an end of the conveyed bundled sheets against its contact surface in the width narrower than the thickness of the bundled sheets partially; a detector to detect sheets protruded from the bundled sheets beyond the contact surface when the bundled sheets was run against the contact surface of the stopper; and a processor to output a signal denoting the result of detection by the detector.

Further, according to this invention, there is provided a bundled sheets processing method comprising: conveying a bundled sheets banded with a strap in the direction substantially orthogonal to the stacking direction of the sheets; placing the contact surface of a stopper in the width narrower than the thickness of the conveyed bundled sheets on a bundle conveying path and partially striking the end of the conveyed bundled sheets in the conveying direction against the contact surface; detecting sheets protruding from the bundled sheets beyond the width of the contact surface in the striking step; and outputting a signal denoting the result of detection in the detecting step.

DETAILED DESCRIPTION OF THE INVENTION

Preferred embodiments of this invention will be explained below in detail referring to the attached drawings.

Figure 1:
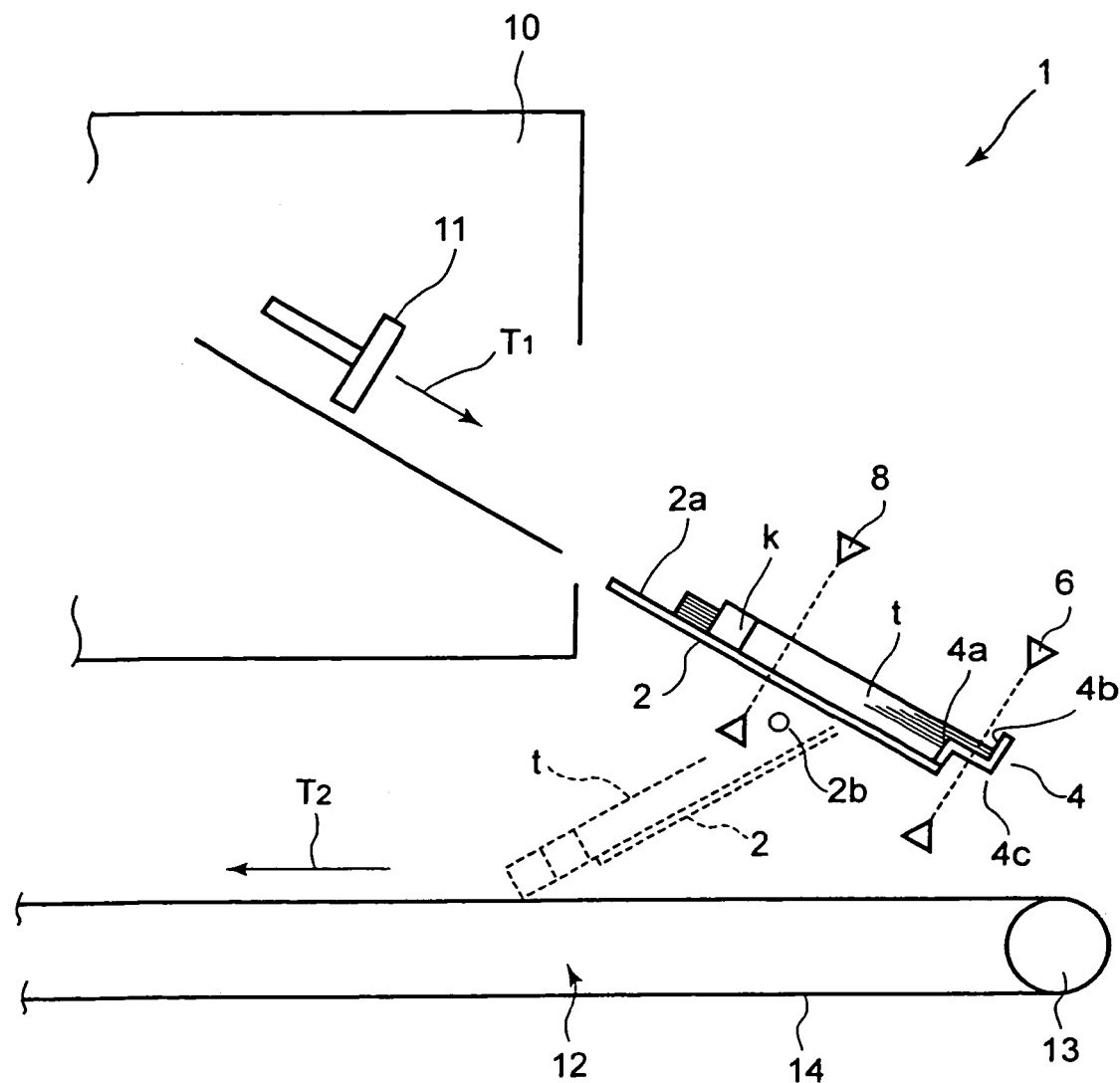
FIG. 1 is a schematic diagram showing a basic structure of a bundled sheet processing apparatus in embodiments of this invention.

In FIG. 1, the structure of the substantial portion of a bundled sheets processing apparatus 1 (hereinafter, simply called as a processor 1) in preferred embodiments of this invention is schematically shown. Processor 1 receives a bundle t of fixed number of sheets (100 sheets in this embodiment) stacked and banded with a strap k from a pre-processor 10 (Arrow $T_1$) and after inspecting the banded state with a strap k, conveys the bundle t to the next process (Arrow $T_2$). The conveying direction of the bundle t is a direction substantially orthogonal to the sheets stacking direction. Further, in this embodiment, only one strap is wound at a position aslant to the rear side in the sheets conveying direction and along the shorter direction of the sheets.

Processor 1 has a chute unit 2 (a bundle receiver) to receive the bundle t pushed out in the arrow direction $T_1$ by a pusher 11 of pre-processor 10. Chute unit 2 has a slope 2a (a first conveyor) inclined downward along the lower right direction; that is, the arrow $T_1$ direction in FIG. 1 and receives a bundle t along this slope 2a by its own weight. Chute unit 2 places and houses a bundle t on slope 2a along the sheets stacking direction. Further, chute unit 2 receives a bundle t in the state arranged at a fist position shown by the solid line in FIG. 1.

At the end of chute unit 2 along the direction of Arrow $T_1$, there is provided a stopper 4 which has a contact surface 4a to stop a bundle t in chute unit 2 by striking its end in the conveying direction against the surface along slope 2. In this embodiment, stopper 4 is moved by a solenoid that will be described later but it may be formed integrally with chute unit 2 with, for example, a sheet of plate member.

Contact surface 4a is in the width narrower than the thickness of a bundle 5 along the sheet stacking direction so as to lie partially on the conveying path of a bundle t. Definitely, contact surface 4a rises at almost the right angle from slope 2a of chute unit 2 and at a height lower than the thickness of a bundle t. Therefore, when a strap k of a bundle is loose, sheets that may not possibly contact surface 4a in a bundle t (several sheets near the top of stacked direction separated from slope 2a in this embodiment) may protrude from a bundle t.

Stopper 4 has a dropped-level portion from contact surface 4a at the inward in the conveying direction and a stopping surface 4b extending nearly in parallel with contact surface 4a. Stopping surface 4b functions to stop a bundle t by striking the end of sheets protruded from a bundle t against stopping surface 4b. Thus, the protruded sheets are protected to come out from a bundle t completely when protruded.

On dropped-level portion 4c of stopper 4, a hole (not shown) is formed to pass the optical axis of an abnormal state detector 6 that functions as a detector to detect the protrusion. Abnormal state detector 6 detects sheets protruded from a bundle t beyond contact surface 4a as the end of a bundle t is run against contact surface 4a of stopper 4. That is, abnormal state detector 6 detects the protrusion of sheets as the end of protruded sheets intercepts the optical axis of abnormal state detector 6.

Further, on slope 2a of chute unit 2, a hole (not shown) to allow the optical axis of a remaining state detector 8 to pass through it is formed. Remaining state detector 8 is located at a position where its optical axis passes through the hole in the state of chute unit 2 set at the first position shown by the solid line and detects a bundle t sent into chute unit 2 and discharged therefrom.

Chute unit 2 is provided so that it can be inclined (movably) centering on a shaft 2b. Chute unit 2 is rotated between the first position shown by the solid line and the second position shown by the broken line in the figure. In this embodiment, chute unit 2 is tilted in a different direction when set at the first position and the second position. Chute 2 drops a housed bundle t by its own weight along slope 2a in the state tilted to the second position shown by the broken line in the figure. At this time, a bundle t is dropped with the rear end in the conveying direction ahead along the arrow direction $T_1$.

Below chute unit 2, a conveyor 12 (a second conveying means) is provided. Conveyor 12 has an endless state conveying belt 14 wound around a conveying roller 13 that is rotated by a motor that is described later. Conveying belt 14 runs in the arrow direction $T_2$ shown in the figure and pulls out the end of a bundle t (the rear end in the conveying direction as described above) dropped from chute unit 2 in the arrow direction $T_2$ and conveys an inspected bundle t to the next processing. That is, when a bundle t is conveyed in the arrow direction $T_2$, a strap k winding a bundle t is positioned at the leading side of the conveying direction.

Figure 2:
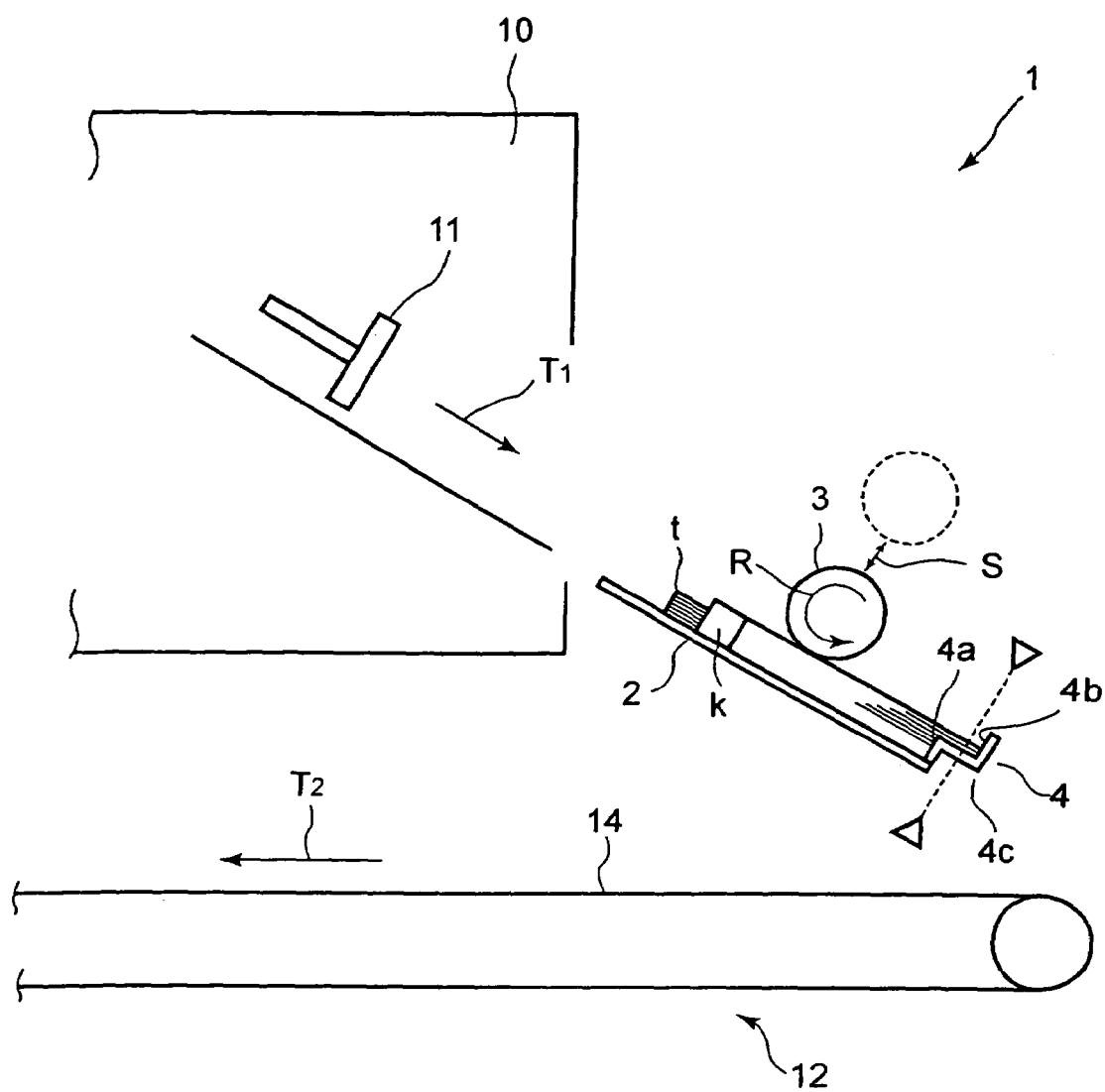
FIG. 2 is a schematic diagram for explaining the function of a rubber roller of the bundled sheets processing apparatus shown in FIG. 1.

A rubber roller 3 that functions as an urging unit of this invention is shown in FIG. 2. Rubber roller 3 is supported rotatably with a contact/separation mechanism that is described later. Further, rubber roller 3 is provided between the position at the side separated from slope surface 2a of a bundle t received in chute unit 2 and the position to separate upward in the arrow direction S in the state so that it is possible to contact/separate in the arrow direction S shown in the figure.

Rubber roller 3 is rotated in the arrow direction R in the figure by a motor described later in the state kept in contact with a top sheet. Thus, the top sheets and several sheets following thereto are urged toward the stopping surface 4b of stopper 4. In other words, rubber roller 3 urges sheets that does not possibly contact stopper 4 (contact surface 4a) in the arrow direction $T_1$.

At this time, several sheets near the top are urged by the rotation of rubber roller 3 even when sheets did not protrude from a bundle t only when it is run against contact surface 4a of stopper 4 and therefore, several sheets are forced to protrude when a strap is slightly loosened.

That is, this rubber roller 3 is provided to operate when desired to improve detecting accuracy of the bundled state of a bundle t. However, rubber roller 3 is not an indispensable component of this invention. Normally, it is only necessary to set a tilt angle of the first position of chute unit 2 so as to set the tilt angle of slope 2 at a desired angle according to detecting accuracy.

FIG. 3 shows a solenoid 5 which functions as a moving means to move stopper 4 and an inner guide 7a and an outer guide 7b both of which function as guiding means to guide a bundle t passed through stopper 4 toward conveyor 12.

Solenoid 5 moves stopper 4 between a stop position and an evacuate position. The stop position is that position where contact surface 4a of stopper 4 is on the conveying path of a bundle t conveyed by its own weight along slope 2a of chute unit 2 that is set at the first position (the position shown by the dotted line in FIG. 3). The evacuate position is that position where contact surface 4a evacuates upward from the bundle t conveying path and allows a bundle t to directly pass through chute unit 2 (the position shown by a solid line in FIG. 3).

Inner guide 7a is provided at the end of chute unit 2 provided at the first position in the continuous position and posture and is curved so as to direct the end of conveying direction of a bundle t passed chute unit 2 to conveyor 12. Further, outer guide 7b is provided at a position opposing to inner guide 7a against which the end of conveying direction of a bundle t passed chute unit 2 is run against so as not to protrude in that running force.

Figure 3A:
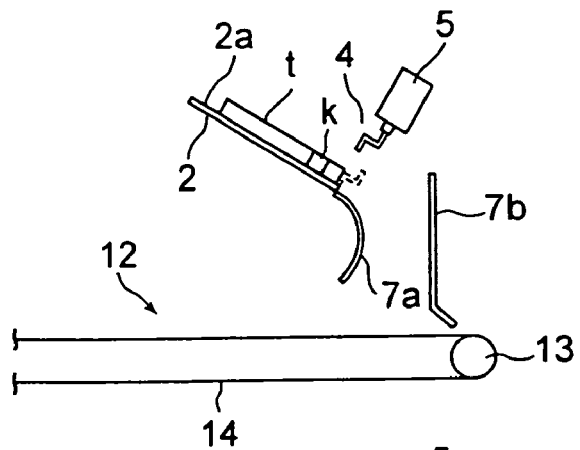
FIG. 3A to FIG. 3D are schematic diagrams for explaining a stopper and a guide of the bundled sheets processing apparatus shown in FIG. 1.
Figure 3B:
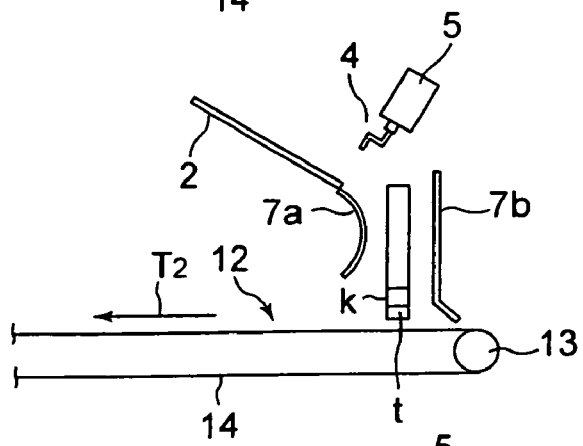

When stopper 4 is moved from the stop position shown in the dotted line to the evacuate position shown in the solid line in FIG. 3A, a bundle t in chute unit 2 is guided by two guides 7a and 7b and drops toward conveyor 12. At this time, the rear end of a bundle t in the conveying direction passes the optical axis of remaining state detector 8 provided in chute unit 2 and with the detector output as a trigger, conveyor 12 in the stopped state starts to run. The state at this time is shown in FIG. 3B.

Figure 3C:
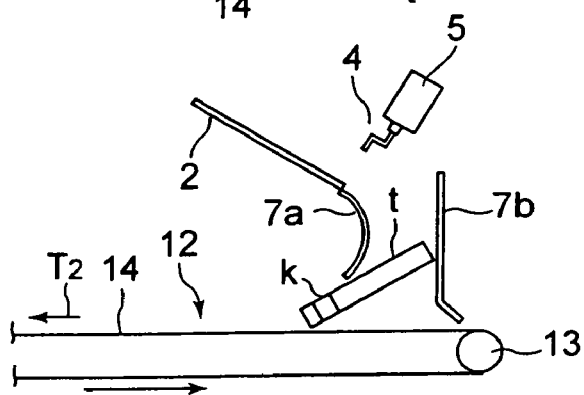
Figure 3D:
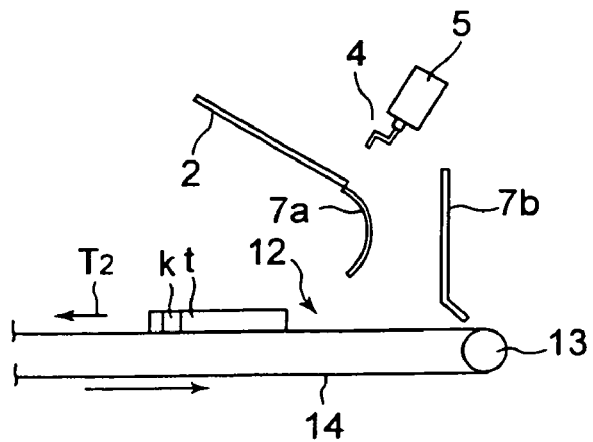

When the end of a bundle t in the conveying direction contacts conveying belt 14, the end of a bundle t in the conveying direction is pulled out in the arrow direction $T_2$ by the friction with conveying belt 14 and conveyed in the arrow direction $T_2$ without changing the conveying direction of a bundle t (FIG. 3D). That is, when a bundle t is conveyed in the arrow direction $T_2$, a strap k binding a bundle t is located at the end side of the conveying direction.

Further, solenoid 5 functioning as a moving means to move stopper 4 and inner guide 7a and outer guide 7b functioning as guiding means may be provided independently without providing a mechanism to rotate chute unit 2 shown in FIG. 1 and FIG. 2. Or, a mechanism to rotate chute unit 2 shown in FIG. 1 and FIG. 2 may be provided jointly with these solenoid 5 and inner and outer guides 7a and 7b.

In an apparatus with a mechanism to rotate chute unit 2 jointly with solenoid 5 and inner and outer guides 7a and 7b, when desired to change the conveying direction of a bundle t stacked in chute unit 2, it is possible to switch back a bundle t by rotating chute unit 2 to the second position in the state of stopper 4 arranged at the stop position shown by the dotted line in FIG. 3A. On the other hand, when it is not desired to change the conveying direction of a bundle t stacked in chute unit 2, a bundle t can be passed by arranging stopper 4 to the evacuate position shown by the solid line and lead to conveyor 12 by two guides 7a and 7b.

Figure 4:
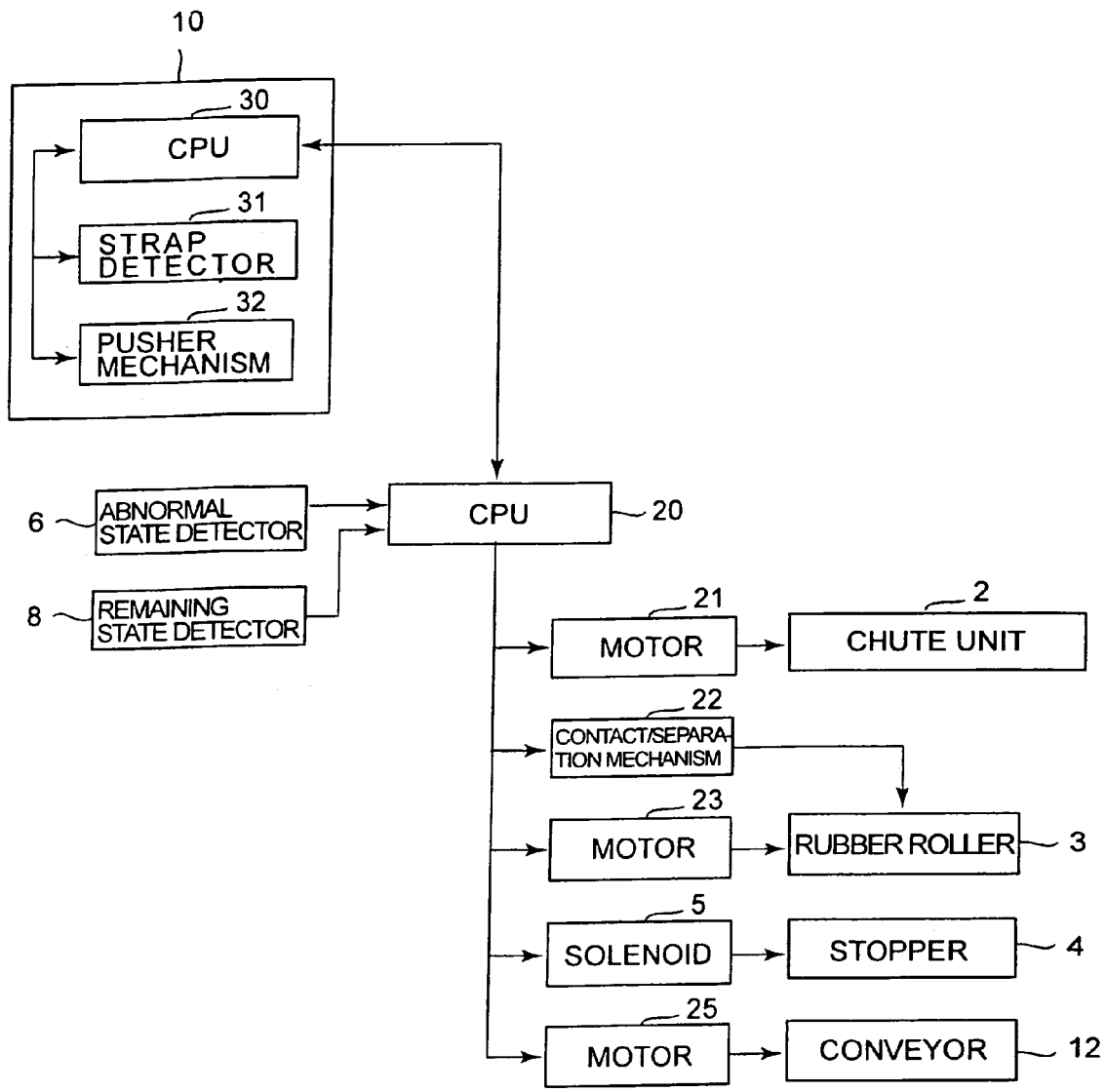
FIG. 4 is a block diagram showing a control system to control the operations of the bundled sheets processing apparatus shown in FIG. 1.

FIG. 4 is a block diagram showing a control system to control the operations of bundled sheets processing apparatus 1.

A CPU 20 (a processor) which controls the operations of processor 1 is connected with above-mentioned abnormal state detector 6 and remaining state detector 8. Further, a motor 21, a contact/separation mechanism 22, a motor 23, solenoid 5 and a motor 25 are connected to CPU 20.

Motor 21 turns chute unit 2 between the first and the second positions. Contact/separation mechanism 22 moves rubber roller 3 in the arrow direction S. Motor 23 turns rubber roller 3 in the arrow direction R with a specified torque. Solenoid 24 moves stopper 4 between the stop position and the evacuate position. Motor 25 runs conveyor 12 in the arrow direction $T_2$.

CPU 20 of processor 1 is connected to a CPU 30 of pre-processor 10. CPU 30 of pre-processor 10 is connected with a strap detector 31 for detecting the direction of a bundle t by detecting the winding position of strap k and a pusher mechanism 32 for operating pusher 11. Strap detector 31 takes a picture of a bundle t and detects the position of strap k based on a color and shape of strap k from an image of the taken picture. A strap k is wound at a position one-sided in the longitudinal direction of a bundle t; that is, the conveying direction and therefore, the direction of a bundle t can be detected by detecting the wound position of a strap k.

Further, the above-mentioned CPU 20, chute unit 2 (slope 2a), stopper 4 (contact surface 4a and stopping surface 4b), abnormal state detector 6, and rubber roller 3 function as components of the bundled sheets processing apparatus.

Figure 5:
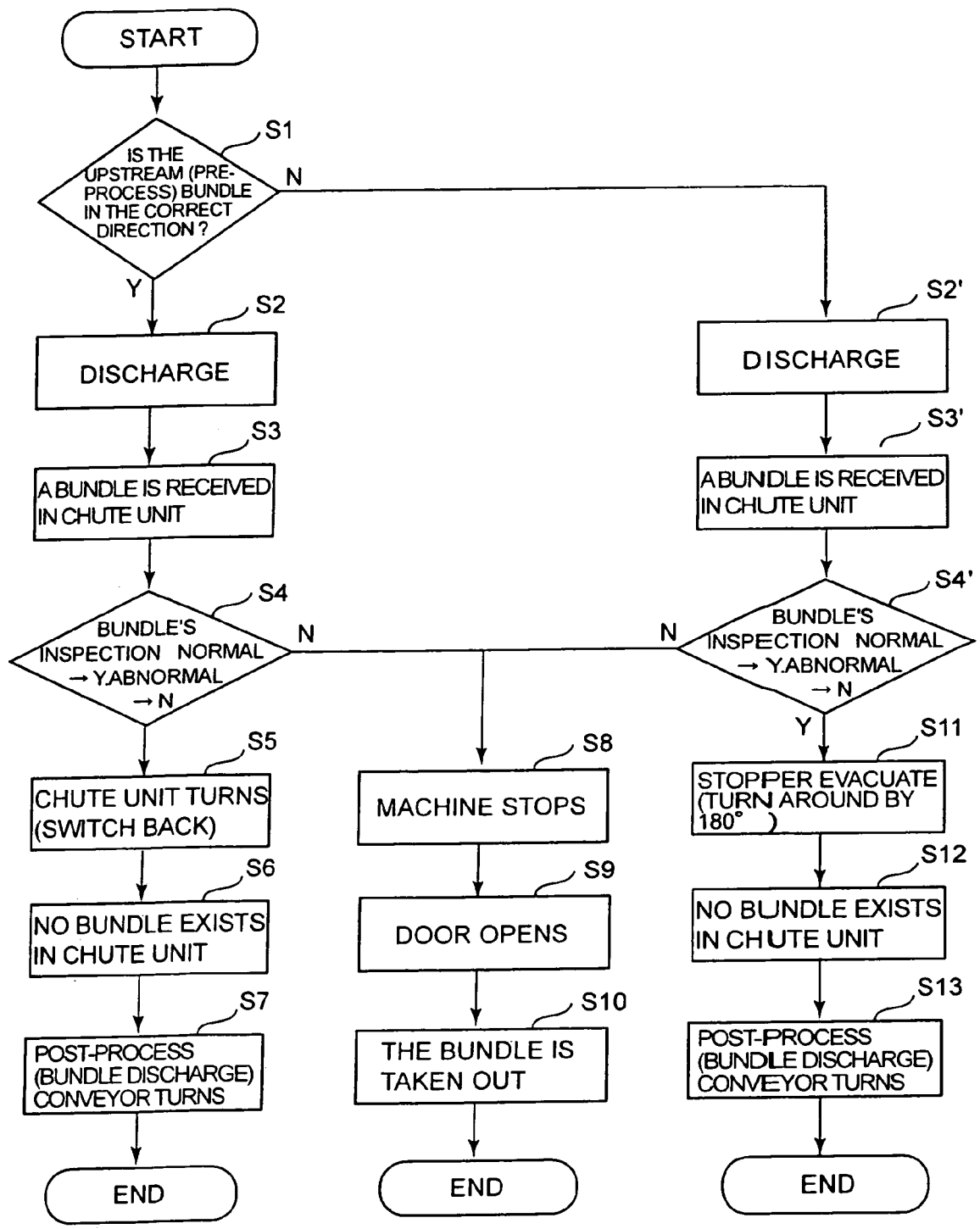
FIG. 5 is a flowchart for explaining the operations of the bundled sheets processing apparatus shown in FIG. 1.

Next, the bundle t processing operation by processor 1 in the structure described above will be explained referring to a flowchart shown in FIG. 5. Further, as the initial state, chute unit 2 is arranged at the first position waiting the receiving of a bundle t and stopper 4 is arranged at the stopping position.

Prior to the operation, the direction of a bundle t detected by strap detector 31 of pre-processor 10 is notified to CPU 20 of processor 1. That is, the direction of a bundle t is detected based on the winding position of a strap k detected by strap detector 31. In this embodiment, only when a bundle t with a strap k wound at a position one-sided to the rear end side in the conveying direction is conveyed into chute unit 2 as shown in FIG. 1, a bundle t is switched back by tilting chute unit 2 to the second position shown by the dotted line in FIG. 1. That is, bundles t passed through this processor 1 are all conveyed to the next processing step with the end of bundle at the strap wound side ahead.

CPU 20 judges whether a bundle t is in the correct direction before a bundle t that is to be processed is sent out from pre-processor 10 based on the notification from CPU 30 of pre-processor 10 (Step 1). In this embodiment, of bundles t sent out from pre-processor 10, the posture (the posture in FIG. 1) of a bundle t with a strap wound at the position one sided to the rear end side in the conveying direction is judged as the right direction.

When a bundle t is judged in the right direction in Step S1 (Step S1: YES), that bundle t is discharged from pre-processor 1 (Step S2) and conveyed into chute unit 2 by pusher 11 of pre-processor 10. At this time, the receipt of a bundle t in chute unit 2 is detected by remaining state detector 8 is notified (Step S3).

Then, when the end of a bundle t in the conveying direction is ran against contact surface 4a of stopper 4, whether there are sheets protruding from a bundle t is judged by abnormal state detector 6 (Step S4). At this time, when the protrusion of part of sheets from a bundle t was detected by abnormal state detector 6, the defective banding state of a bundle t is judged (Step S4; NO). When the output of abnormal state detector 6 is clear, the banding state of a bundle t is judged as being good if no protruded sheets from a bundle t was detected by abnormal state detector 6 (Step S4; YES).

When the good banding state is judged in Step S4 (Step S4; YES), chute unit 2 is turned to the second position in the state by motor 21 with stopper 4 arranged at the stop position (Step S5) and a bundle t is dropped toward conveyor 12 as shown by the dotted line in FIG. 1.

Then, when remaining state detector 8 detects that there in no bundle t in chute unit 2 (Step S6), motor 25 is turned and the running of conveyor 12 starts (Step S7). A bundle t dropped on conveyor 12 is conveyed in the arrow direction $T_2$; that is, to the next step in the state with a strap positioned at the top to convey a bundle t. Thereafter, chute unit 2 is turned by motor 21 and returned to the first position shown by the solid line in FIG. 1.

On the other hand, when the banded state was judged as defective in Step S4 (Step S4; NO), motor 21 of chute unit 2 is not driven and processor 1 is stopped jointly with pre-processor 10 (Step S8). That is, CPU 20 outputs a signal denoting that abnormal state detector 6 detects a defectively strapped bundle to stop processor 1. When processor 1 is stopped, a door (not shown) of processor 1 is opened (Step S9) and a defectively strapped bundle t is taken out from processor 1 by operator (Step S10).

Further, when a bundle t was judged to be not in a correct direction by strap detector 31 (Step 1; NO), the same processes of Step S2' to Step S4' as in the above-mentioned Step 2 to Step 4 are executed. Then, in Step S4' the banded state of a bundle t is judged defective (Step S4'; NO), the process is shifted to the processes in Step S8 to Step S10.

Further, when the direction of a bundle t was judged not correct in Step S1 but the banded state was judged good in Step 4'(Step S4'; YES), stopper 4 is moved to the evacuate position by solenoid as shown in FIG. 3A (Step S11). When stopper 4 was moved to the evacuate position, a bundle t in chute unit 2 passes stopper 4 and is led to conveyor 12 by two guides 7a and 7b as shown in FIG. 3B and FIG. 3C.

Then, when no bundle t existing in chute unit 2 is detected by remaining state detector 8 (Step S12), motor 25 is driven and conveyor 12 starts to run (Step S13). A bundle t lead to conveyor 12 is conveyed in the arrow direction $T_2$; that is, to the next step in the state with a strap k positioned at the head side of a bundle t. Hereafter, stopper 4 is restored to the stop position by solenoid 5.

As described above, according to this embodiment, a bundle t conveyed by its own weight along slope 2a is put in chute unit 2 and at the same time, the banded state of a bundle t can be detected. Thereafter, by rotating chute unit 2 selectively, the conveying direction of a bundle t can be changed. That is, the structure for inspecting the banded state can be partially used as a structure for changing the direction of bundle t. Thus, the structure of the apparatus can be simplified and a manufacturing cost of the apparatus can be reduced.

Further, according to this embodiment, sheets are forced to protrude by striking the end of a bundle t in the conveying direction against contact surface 4a of stopper 4 and therefore, the banding state of a strap k can be inspected more certainly. Further, when inspection accuracy of the banding state is desired to improve, it is sufficient to operate rubber roller 3 shown in FIG. 2. Thus, the banded state of a bundle t can be prevented from becoming loose when being conveyed in the later stage of processing as a result of a loosing of a strap k and drop of sheets can be surely prevented.

Figure 6:
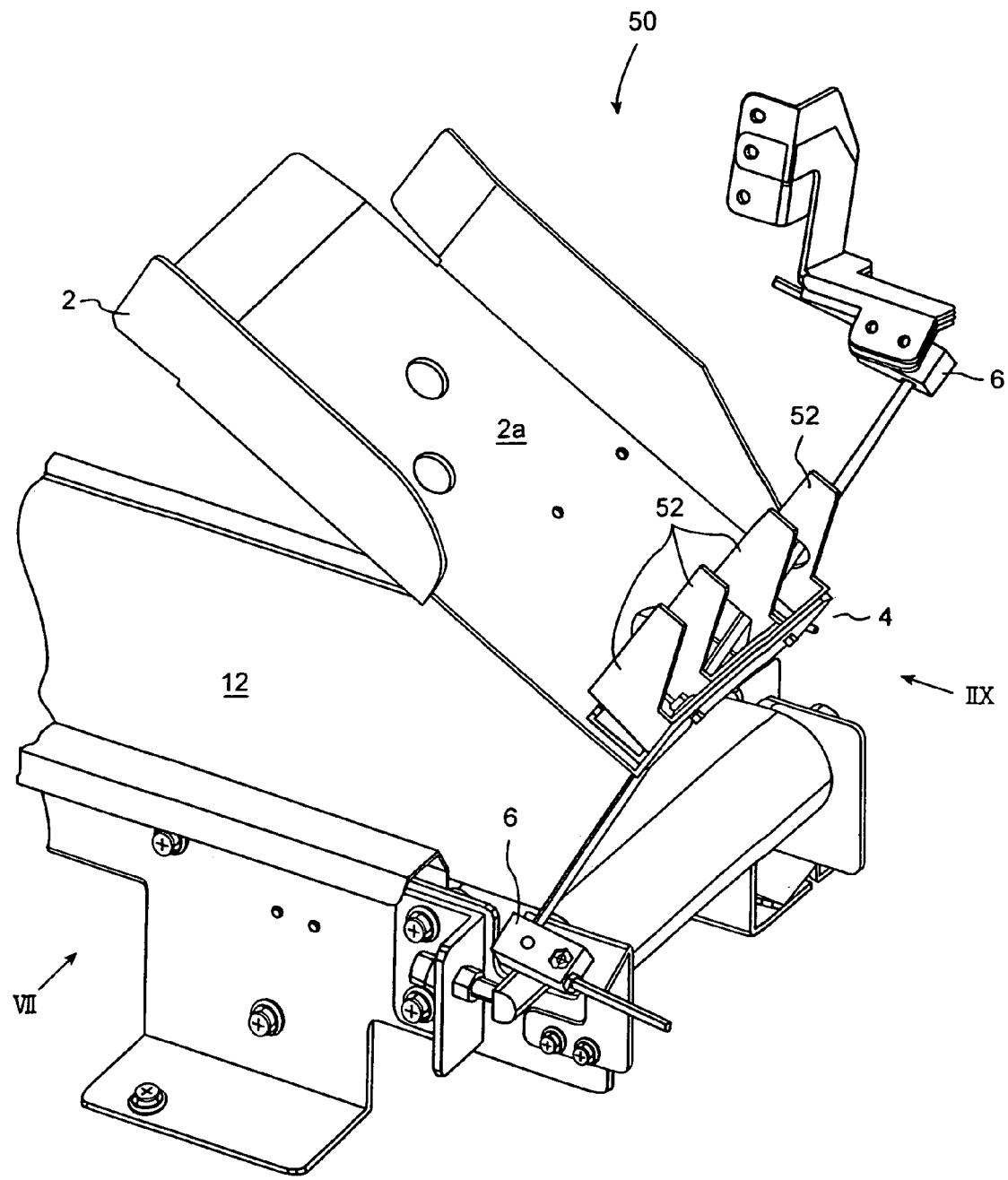
FIG. 6 is a schematic perspective view showing the bundled sheets processing apparatus in another embodiment of this invention.
Figure 7:
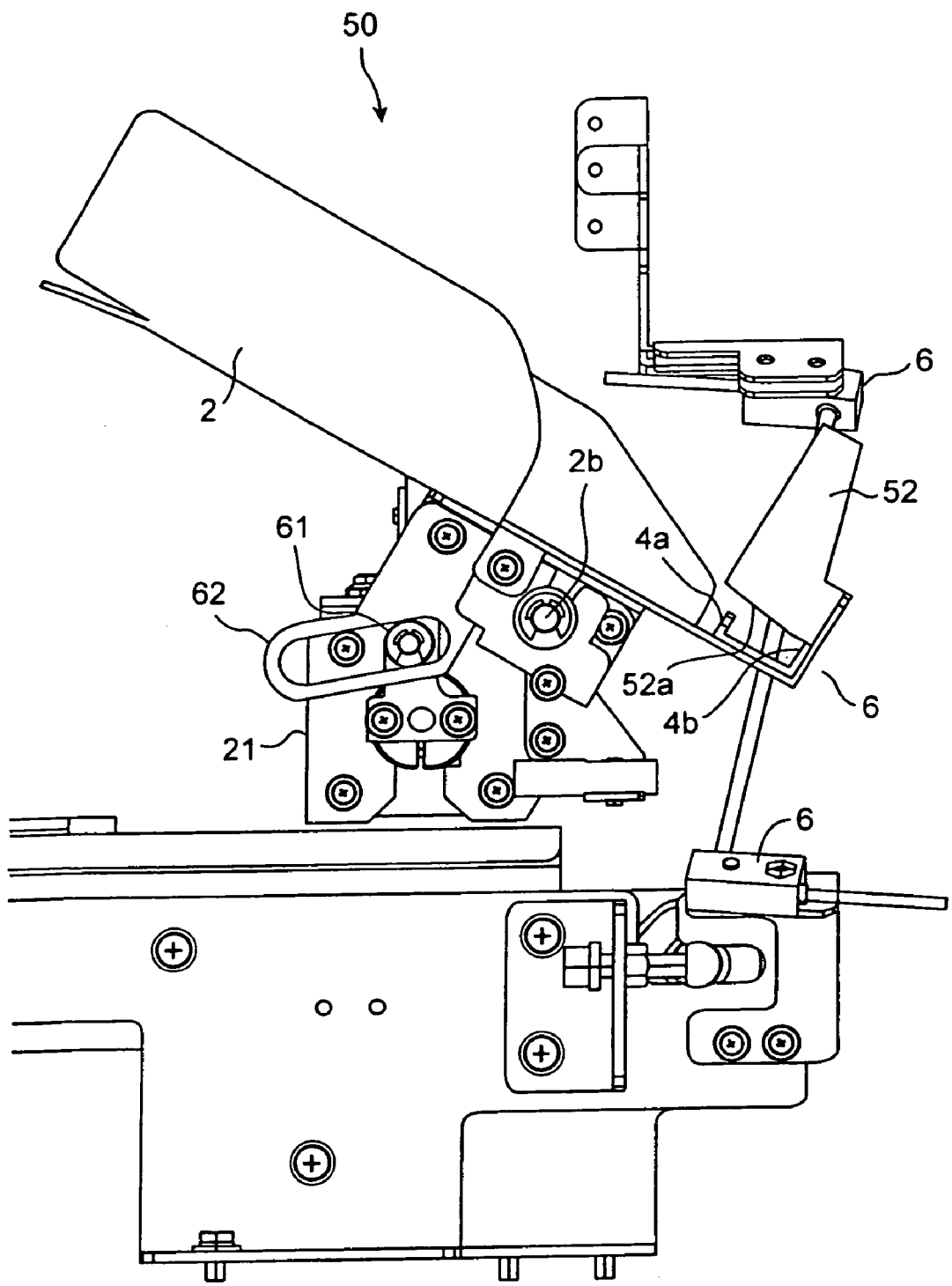
FIG. 7 is a front view of the bundled sheets processing apparatus shown in FIG. 6.
Figure 8:
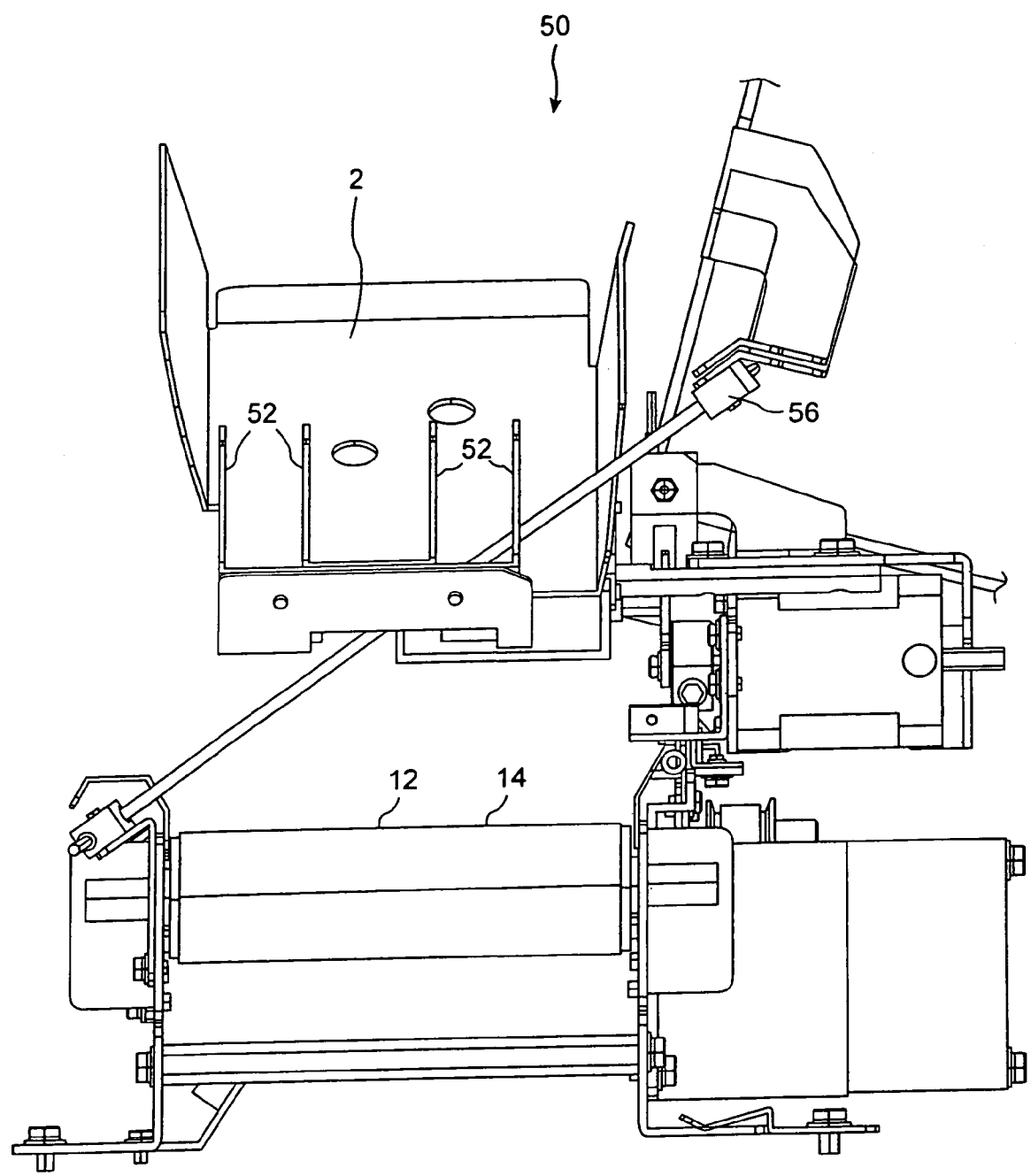
FIG. 8 is a side view of the bundled sheets processing apparatus shown in FIG. 6.

Next, a bundled sheets processing apparatus 50 (hereinafter, simply called as a processor 50) in other embodiment of this invention will be explained referring to FIG. 6 to FIG. 8. Further, the same component elements functioning similarly to the processor 1 described above will be assigned with the same reference numerals and detailed explanation thereof will be omitted here. FIG. 6 shows a perspective view of processor 50, FIG. 7 shows its front view and FIG. 8 shows its side view.

In other words, processor 50 has a holding member 52 near stopper 4 against which the end in the conveying direction of a bundle conveyed along slope 21 to hold sheets protruded from contact surface 4a in the stacking direction of them. Holding member 52 is made of plural plate member separated each other along the width direction of a bundle t and fixed to chute unit 2.

That is, processor 50 in this embodiment is in a structure to switch back all bundles t having no structure to evacuate stopper 5 as explained in FIG. 3 and therefore, stopper 4 and holding member 52 are fixed to chute unit 2. Further, chute unit 2 is tilted between the above-mentioned first and second positions by the actions of a cam follower 61 fixed to a rotary shaft of motor 21 and a cam 62 fixed on the lower surface side of chute unit 2.

In more detail, holding member 52 has a tilted guide surface 52a to guide sheets (not illustrated) protruded from a bundle t beyond contact surface 4a of stopper 4 toward stopping surface 4b. In other words, guide surface 52 of each holding member 52 contacts a part of a bundle t immediately before contacting contact surface 4a and directs the ends of contacted sheets; that is, sheets protruded exceeding contact surface toward stopping surface 4b.

Thus, sheets protruded from beyond contact surface 4a of stopper are prevented from flapping in the stacking direction and from dropping completely from a bundle t certainly.

Figure 9:
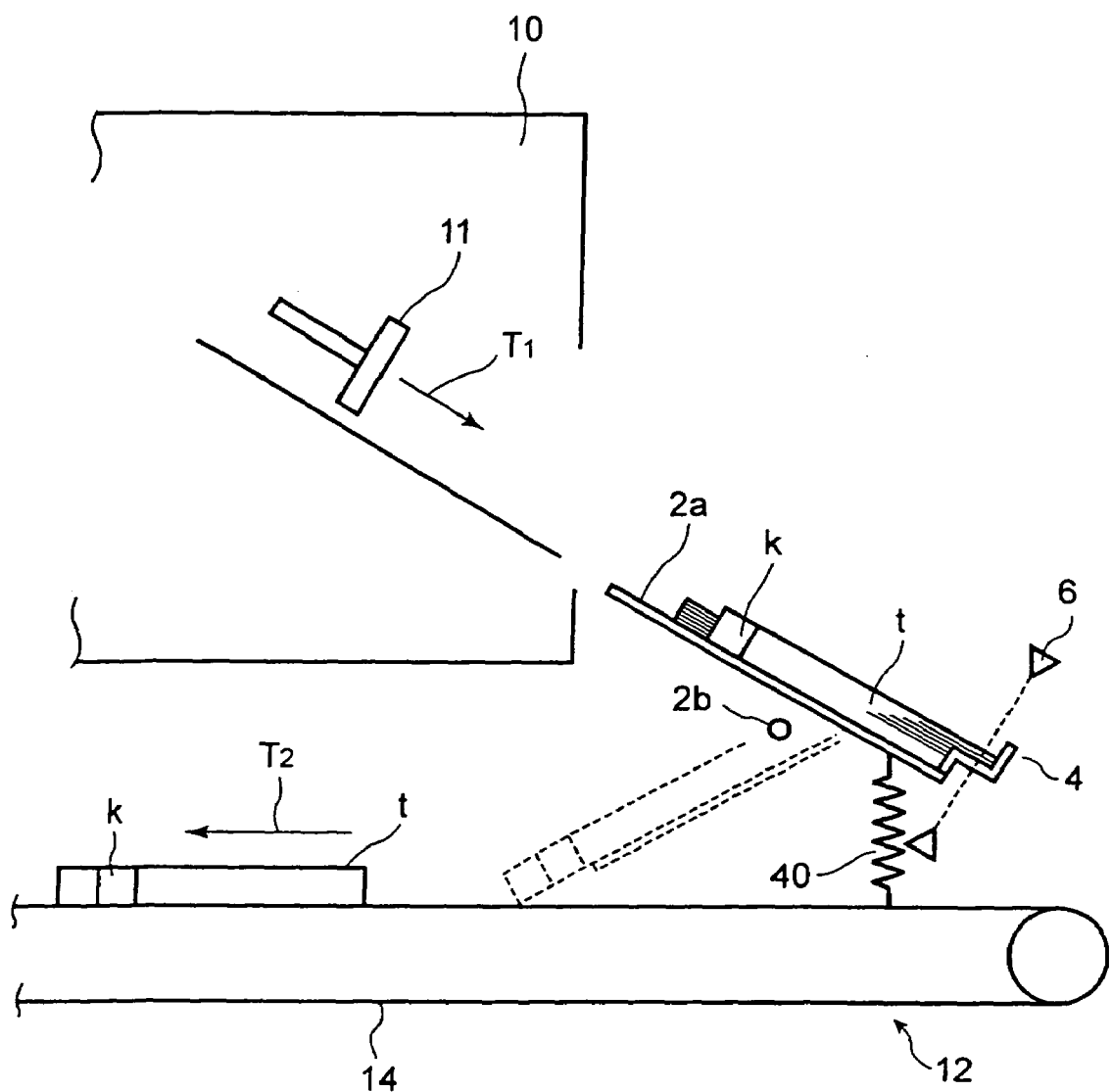
FIG. 9 is a schematic diagram showing a modification of the bundled sheets processing apparatus shown in FIG. 1.

Further, this invention is not restricted to the embodiments described above but can be modified variously within the scope of this invention. For example, in the above-mentioned embodiments, a case to tilt chute unit 2 by motor 21 was explained but not limiting to this but chute unit 2 may be tilted by its own weight without using a driving mechanism as shown in FIG. 9.

That is, shaft 2b may be provided in chute unit 2 so that chute unit 2 is tilted to the first position shown by the solid line in the state with no bundle t housed therein and is tilted to the second position shown by the dotted line in the state with a bundle t housed therein. In other words, shaft 2n may be arranged by locating so that the center of gravity of chute unit 2 is located at the stopper 4 side from shaft 6b when a bundle t is not housed therein and the center of gravity of chute unit 2 is located at the pre-processor 10 side from shaft 2b when a bundle t is housed therein.

Thus, a driving mechanism to rotate chute unit 2 can be omitted and the structure of the apparatus can be more simplified. Further, in this embodiment, a return spring is provided to chute unit 2 for returning chute unit 2 to the first position certainly.

Further, in the embodiment described above, a case to detect protruded sheets by conveying a bundle t in the longitudinal direction and striking against the stopper was explained. However, not restricting to this case, a bundle t may be conveyed in its shorter direction when it is almost orthogonal to the stacking direction of sheets.

In any case, it is sufficient to strike a loosely banded bundle with a strap against the stopper so as to protrude some sheets from the bundle.

Further, in the above embodiment, a case to detect sheets protruded from a bundle by partially striking the end of a bundle in the conveying direction against the stopper projected by a specified amount from the conveying surface of a bundle. However, not restricting to this case, the contact surface of the stopper may be provided at a position separated from the conveying surface by considering a thickness of a bundle along the sheets stacking direction. In this case, sheets protruded from a bundle at the side near the conveying surface are detected. That is, portions of sheets protruded from the lower surface side of a bundle t may be detected.

Further, in the above-mentioned embodiment, a case when a bundle t was conveyed by its own weight along slope 2a by tilting chute unit 2 to the first position when receiving a bundle t from pre-processor 10. However, not restricted to this case, chute unit 2 is arranged almost horizontally and another conveying mechanism may be provided.

As explained above, according to a bundled sheet processing apparatus and a bundled sheets processing method of this invention, the banding state of bundles of banded sheets can be inspected surely, the deforming of bundled posture can be prevented, and drop-off of sheets can be prevented.

What is claimed is:

1. A bundled sheets processing apparatus comprising:
   a conveying unit to convey a bundle comprising stacked sheets banded with a strap in a direction substantially orthogonal to a stacking direction of the sheets;
   a stopping member having a contact surface which has a height lower than a thickness of the bundle in the stacking direction to stop the bundle conveyed by the conveying unit by partially contacting an end of the conveyed bundle with the contact surface; and
   a control unit configured to (a) receive a detection result indicating whether a portion of a sheet of the bundle protrudes beyond the contact surface when the bundle is stopped by the contact surface of the stopping member and to (b) control conveyance of the bundle based on the detection result.

2. The bundled sheets processing apparatus according to claim 1, wherein the conveying unit has a slope tilted downward to the stopping member and conveys the bundle by its own weight along the slope.

3. The bundled sheets processing apparatus according to claim 1, wherein the stopping member further includes a stopping surface to prevent sheets from protruding beyond the contact surface by contacting the end of the bundle.

4. The bundled sheets processing apparatus according to claim 3 further comprising:
   a holding member to hold sheets protruding from the bundle beyond the contact surface.

5. The bundled sheets processing apparatus according to claim 4, wherein the holding member has a guide surface to contact a part of the bundle immediately before the bundle contacts the contact surface and has a guide surface to guide sheets protruding from the bundle beyond the contact surface.

6. The bundled sheets processing apparatus according to claim 1, further comprising a detector in communication with said control unit, said detector configured to detect the portion of the sheet of the bundle that protrudes beyond the contact surface.

7. The bundled sheets processing apparatus according to claim 1, wherein said stopping member is attached to said conveying unit.

8. The bundled sheets processing apparatus according to claim 1, wherein said control unit is configured to rotate said conveying unit to allow conveyance of said bundle from said conveying unit to a second conveying unit.

9. The bundled sheets processing apparatus according to claim 1, wherein said control unit is configured to control an urging unit to urge the bundle in the conveying direction by turning while in contact with a top sheet of the bundle conveyed by the conveying unit.

10. The bundled sheets processing apparatus according to claim 1, wherein said control unit is configured to control a second conveying unit that is constructed and arranged to receive said bundle from said conveying unit.

* * * * *